Oct. 14, 1924.
B. J. SYNSTELIEN
1,511,244
CORN CARRYING ATTACHMENT FOR CORN PICKING AND HUSKING MACHINES
Filed Feb. 20, 1924
3 Sheets-Sheet 2
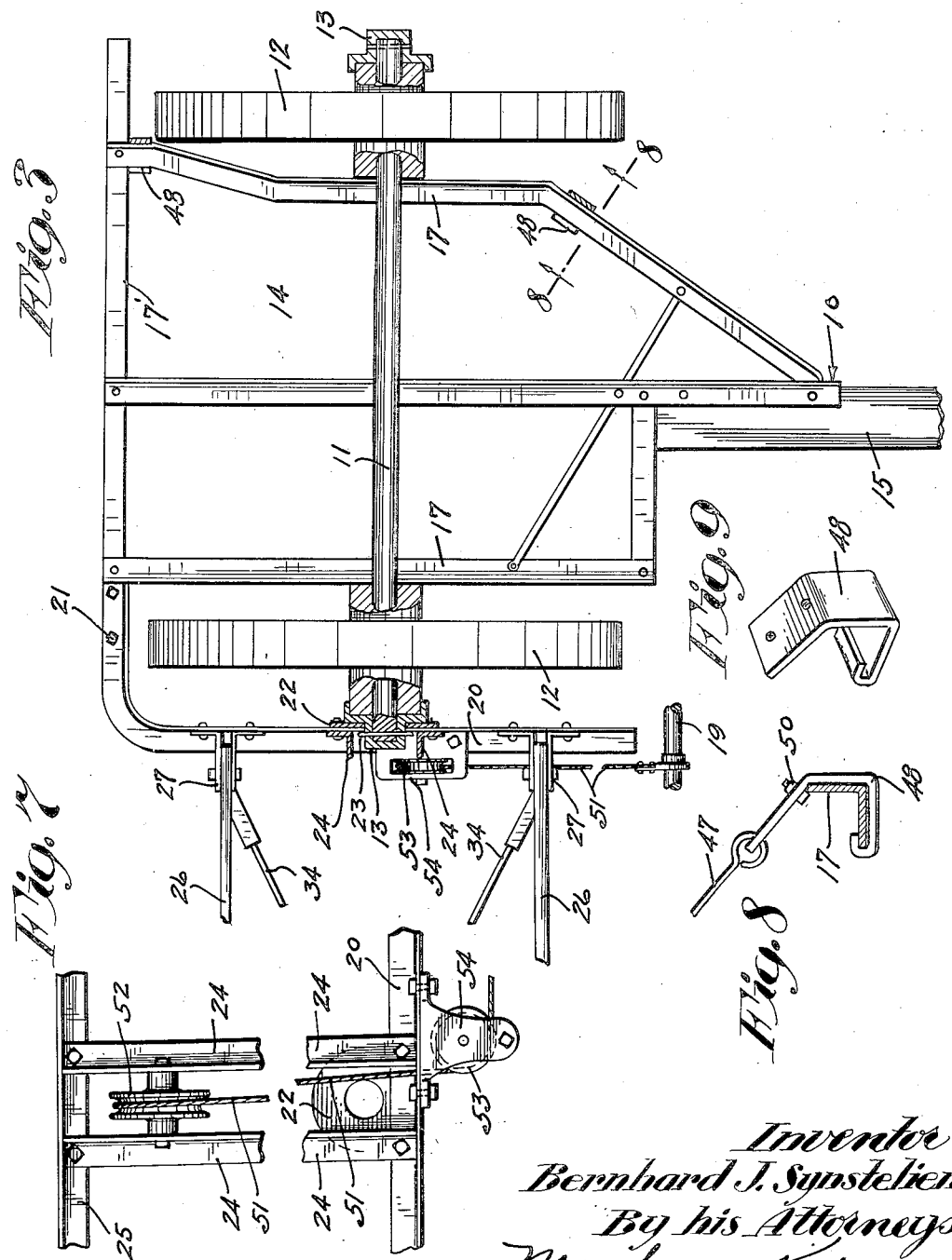
Inventor
Bernhard J. Synstelien
By his Attorneys

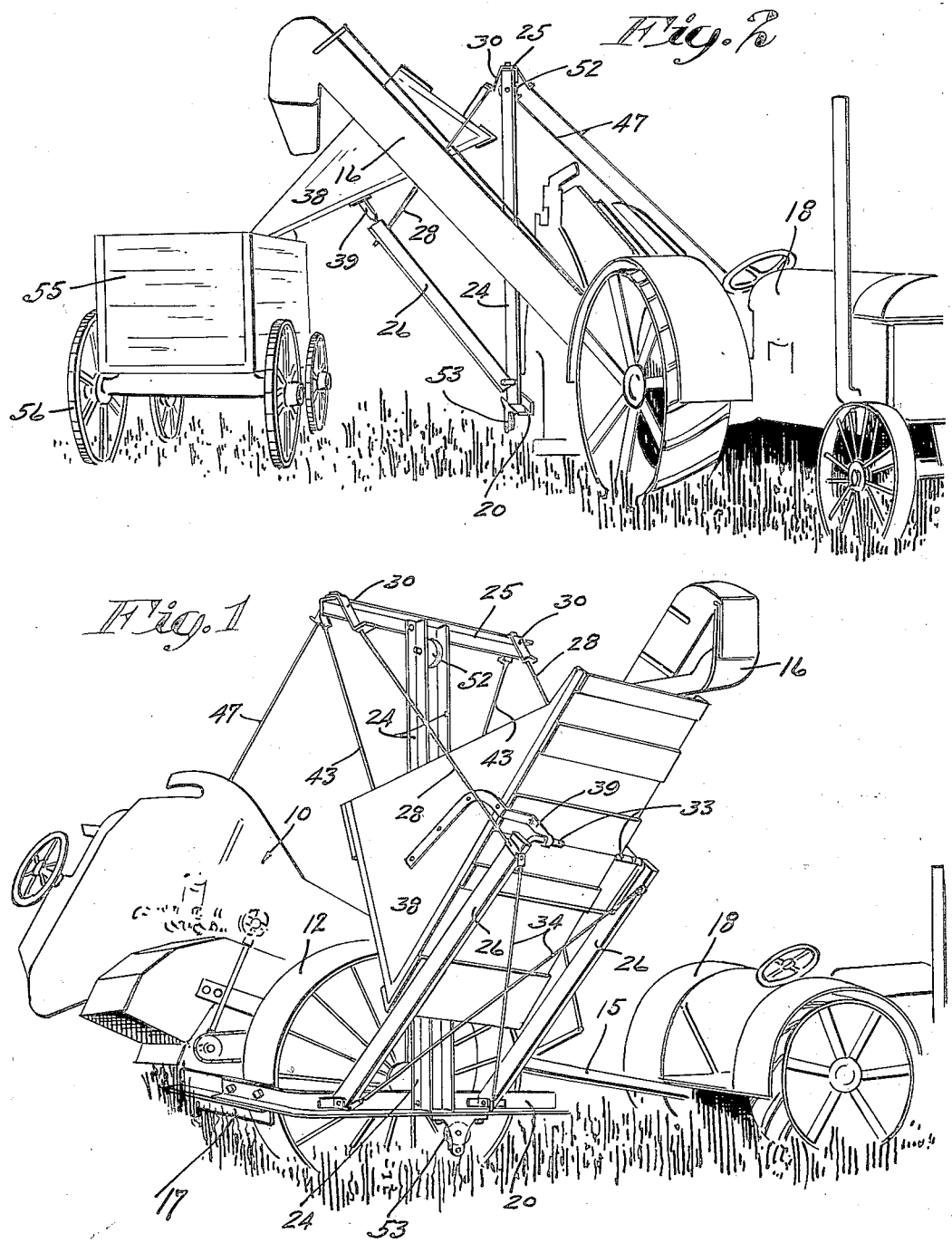

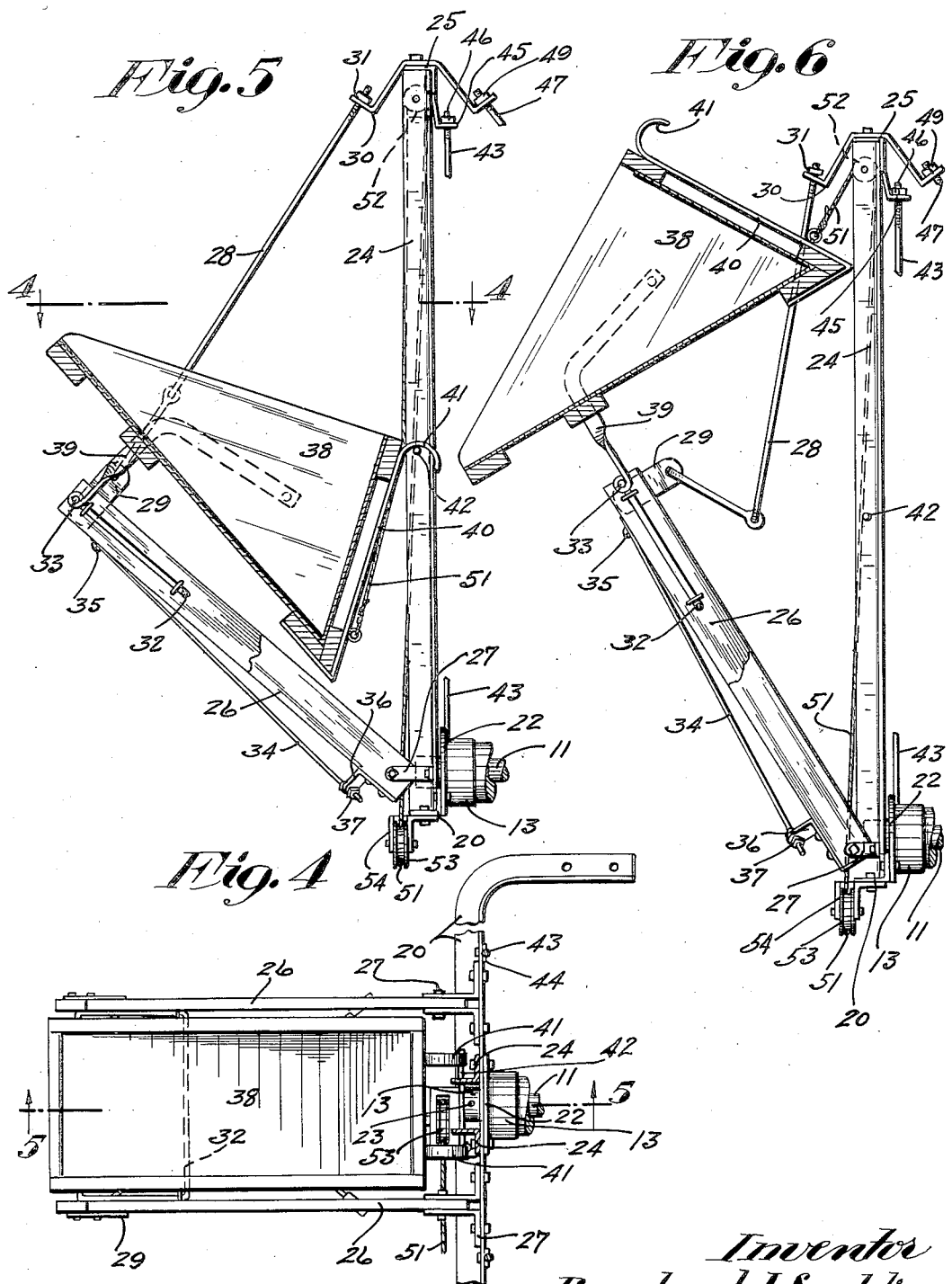

Patented Oct. 14, 1924.

1,511,244

UNITED STATES PATENT OFFICE.

BERNHARD J. SYNSTELIEN, OF FONDA, IOWA, ASSIGNOR OF ONE-HALF TO WILLIAM J. POSAKONY, OF POCAHONTAS, IOWA.

CORN-CARRYING ATTACHMENT FOR CORN PICKING AND HUSKING MACHINES.

Application filed February 20, 1924. Serial No. 694,012.

*To all whom it may concern:*

Be it known that I, BERNHARD J. SYNSTELIEN, a citizen of the United States, residing at Fonda, in the county of Pocahontas and State of Iowa, have invented certain new and useful Improvements in Corn-Carrying Attachments for Corn Picking and Husking Machines; and I do hereby declare the following to be a full, clear, and exact description of the invention, such as will enable others skilled in the art to which it appertains to make and use the same.

My invention has for its object to provide a corn-carrying attachment for corn-picking and husking machines, and to this end it consists of the novel devices and combinations of devices hereinafter described and defined in the claims.

As is well known, it is now necessary to follow a corn-picking and husking machine with a wagon, drawn by a team of horses or otherwise, to receive corn as the same is discharged from the elevator of said machine.

By the use of my attachment, which is in the nature of a dumping receptacle or carrier, corn discharged from the elevator of the machine is collected during the travel of the machine across a field and then discharged from the receptacle or carrier into the box of a wagon at the end of the field, thus making a corn-picking and husking machine a one man outfit by eliminating the wagon which customarily follows the machine through the field.

In the accompanying drawings, which illustrate the invention, like characters indicate like parts throughout the several views.

Referring to the drawings:

Fig. 1 is a perspective view of a corn-picking and husking machine, equipped with the attachment, and which machine is attached to a tractor;

Fig. 2 is a perspective view of the parts shown in Fig. 1, and further illustrating a wagon into which the receptacle of the attachment is positioned to dump;

Fig. 3 is a fragmentary plan view of the frame of the machine and connected parts of the attachment;

Fig. 4 is a view of the attachment and connected portion of the machine axle and hub, principally in plan with some parts sectioned on the line 4—4 of Fig. 5;

Fig. 5 is a view partly in side elevation and partly in vertical section taken on the line 5—5 of Fig. 4;

Fig. 6 is a view corresponding to Fig. 5 with the exception that the receptacle is moved into a dumping position;

Fig. 7 is a fragmentary front elevation of the attachment frame and mast;

Fig. 8 is a detail view with some parts sectioned on the line 8—8 of Fig. 3; and Fig. 9 is a perspective view of the anchor bracket shown in Fig. 8.

The numeral 10 indicates a corn-picking and husking machine as an entirety, with the exception of the axle 11, wheels 12 wheel caps 13, frame 14, tongue 15 and elevator 16. It will be noted that the frame 14 is formed from angle bars and includes side members 17 and rear end members 17', the ends of which extend outward of the frame side members 17.

The machine 10 may be drawn or propelled in any suitable way, and as one means there is illustrated in the drawing a tractor indicated as an entirety by the numeral 18, with the exception of the draw bar 19 to which the tongue 15 of said machine is coupled.

The attachment includes a horizontal L-shaped angle frame bar 20, the short end of which overlaps the projecting right-hand end of the rear end frame bar 17' and is detachably bolted thereto at 21. The long end of the frame bar 20 extends forward, outward of the right-hand wheel 12, and has permanently secured thereto an upstanding bearing bracket 22 through which the reduced outer end of the respective hub cap 13 projects. The same cotter pin 23 that holds the hub cap 13 on the axle 11 engages the outer face of the bearing bracket 22 and holds the frame bar 20 on said hub cap. There is sufficient play between the wheel cap 13 and bearing bracket 22 to permit considerable flexibility between the attachment and the machine 10.

Rigidly secured to the frame bar 20 is a mast 24 comprising a pair of upright laterally spaced angle bars between which the respective hub cap 13 projects. The members of the mast 24 are rigidly connected at their upper ends by a horizontal top angle bar 25, the ends of which project materially outward from said mast and longitudinally of the vehicle.

A pair of outwardly and upwardly projecting arms 26 are attached to the frame bar 20 by hinge brackets 27 for swinging movement transversely of the machine 10. These arms 26 have their free or upper ends attached to the top bar 25 of the mast 24 by a pair of flexible cables 28 which, as shown, are in the form of jointed rods. These cables 28 have their lower ends pivotally attached to the arms 26 by means of upstanding ears 29, and their upper ends extend through apertures in anchor brackets 30, in the form of saddles on the top bar 25, and have applied thereto adjusting nuts 31.

A cross tie rod 32 connects the arms 26 near their outer end portions. The end portions of the rod 32 are extended outward parallel to the arms 26 and then bent toward each other to afford a pair of trunnions 33. The arms 26 are further connected by a pair of cross brace rods 34, the upper ends of which are pivotally attached at 35 to the under sides of the arms 26 near their upper ends, and their lower ends are extended through apertured lugs 36 secured to the lower end portions of the arms and have applied thereto adjusting nuts 37.

A hopper-like dumping receptacle or carrier 38 is carried by the arms 26 for vertical swinging and lifting movements, and is normally positioned to receive corn as the same is discharged from the elevator 16. To attach the carrier 38 to the arms 26 for swinging movement, there is rigidly secured to the bottom a pair of depending hinge bars 39 journaled on the trunnions 33. These hinge bars 39 are located materially forward of the longitudinal center of the carrier 38. Normally, the carrier 38 is supported against swinging movement by a pair of upright hanger bars 40, rigidly secured to the back of said carrier, that have hook-like upper ends 41 that rest upon a transverse rod 42 secured to the mast 24. The lower end portions of the hanger bars 40 are bent laterally and engage the bottom of the carrier 38 to help support the weight.

The mast 24 is held in an upright position against movement longitudinally of the machine 10 by a pair of cross brace rods 43, the lower ends of which are pivoted at 44 to the frame bar 20, outward of the mast 24, and the upper ends of which extend through apertured lugs 45 on the top bar 25 and have adjusting nuts 46 applied thereto. The mast 24 is further held in an upright position against outward transverse movement of the machine 10 by a pair of brace rods 47 which extend transversely over the machine 10. These brace rods 47 have their lower ends pivotally attached to anchor brackets 48 on the left-hand frame bar 17 and their upper ends extended through apertures in the saddle brackets 30, on the opposite side of the mast 24 from the flexible cables 28, and have applied thereto adjusting nuts 49. The anchor brackets 48 are separably interlocked with the respective angle frame bar 17, and held interlocked therewith by short nut-equipped bolts 50 secured in said brackets and arranged to engage the upper edge of the vertical flange of said bar, as best shown in Fig. 8.

One end of a cable 51 is anchored to the back of the carrier 38 near the bottom thereof and is arranged to run over upper and lower guide sheaves 52 and 53, respectively. The guide sheave 52 is journaled on the mast 24 just under the top bar 25, and between the members thereof and the guide sheave 53 is journaled on a depending bracket 54 secured to the frame bar 20.

Various different means may be used to pull or wind up the other or outer end of the cable 51, and thereby move the carrier 38 into a dumping position. One of the simplest means for doing this is to detach the tractor 18 from the machine 10 and attach the outer end of the cable 51 to the draw bar 19 of said tractor, as shown in Fig. 3, and then drive said tractor forward.

From the above description it is evident that the method of carrying the carrier 38 and the shape thereof brings the greater part of its weight close to the machine 10 and on the axle 11 thereof. During the dumping action of the carrier 38, the inner end thereof is lifted by the cable 51, and which cable also draws said carrier 38 inward so that its inner end engages the mast 24 as a guide and slides thereon.

To dump or discharge the corn in the carrier 38 into the box 55 of the wagon 56, at one end of a field, as shown in Fig. 2, the cable 51 is drawn forward or wound on a drum as previously stated. The lifting movement of the rear end of the carrier 38 by the cable will cause said carrier to swing on the trunnions 33 and the pull of the cable 40 on the carrier 38 will cause said carrier, at its inner end, to engage the mast 24 as a guide and slide thereon. After the rear end of the carrier 38 has been moved above a certain elevation, the arms 26 will be drawn toward the mast 24, which is permitted by the flexible cable 28, and thereby elevate the entire carrier 38 at the same time its rear end is being elevated. This bodily lifting movement of the carrier 38 is important as it positions said carrier to dump into the wagon box 55 when the same is substantially full of corn. When the carrier 38 is in a dumping position, as shown in Fig. 6, the inclination of the bottom thereof is such that the corn in the carrier will freely slide therefrom. To return the carrier 38 to normal position, it is only necessary to release the pull on the cable 51 and allow said carrier to drop under the action of gravity.

In applying my attachment to the machine 10 there is only one change to make, and that is to position the elevator spout so that the corn will be discharged rearward instead of laterally. The capacity of the carrier, of course, may be varied, at will.

It will be noted that all of the rods 28—34—43—47 are made adjustable which is necessary because the attachment is subject to severe strains as the same is carried over uneven fields by the machine 10.

What I claim is:

1. An attachment for a corn-picking and husking machine having an elevator and including a mast, a swinging arm, a cable holding the arm with freedom for swinging movement toward the mast, a dumping carrier on the swinging arm adapted to receive corn from the elevator of said machine, and means for moving the carrier into a dumping position.

2. An attachment for a corn-picking and husking machine having an elevator and including a mast, a swinging arm, a cable holding the arm with freedom for swinging movement toward the mast, a dumping carrier on the swinging arm adapted to receive corn from the elevator of said machine, means on the mast for releasably holding the carrier in normal position, and means for moving the carrier into a dumping position.

3. An attachment for a corn-picking and husking machine having an elevator and including a mast, a swinging arm, a cable anchored to the mast for holding the arm with freedom for swinging movement toward the mast, a dumping carrier hinged to the free end of the arm and engaging the mast as a vertical guide and adapted to receive corn from the elevator of said machine, means on the mast for releasably holding the carrier in normal position, and means for elevating the inner end of the carrier and holding the same against the mast, whereby the arm is caused to swing toward the mast and thereby bodily elevate the carrier during its dumping action.

4. The structure defined in claim 3 in which the carrier is constructed and mounted to position its greatest weight close to the mast.

5. An attachment for a corn-picking and husking machine having an elevator and including a mast, a pair of arms hinged in respect to the mast, cables anchored to the mast and holding the arms with freedom for swinging movement toward the mast, a dumping carrier hinged to the free ends of the arms and engaging the mast as a vertical guide, said carrier being adapted to receive corn from the elevator of said machine, a releasable hook-like hanger supporting the dumping carrier from the mast, a cable attached to the carrier and arranged to run over a guide sheave on the mast, said cable being arranged to draw the carrier against the mast during its dumping movement and thereby cause the arms to swing toward the mast and bodily elevate the carrier, and means for operating the cable.

6. The structure defined in claim 5 in which at least one of said cables is longitudinally adjustable.

7. The structure defined in claim 5 in which the arms are connected by a pair of cross tie rods, at least one of which is longitudinally adjustable.

8. An attachment for a corn-picking and husking machine having an elevator and including a frame bar applicable to said machine at one side thereof, a mast on the frame bar, a swinging arm hinged to the frame bar, a cable anchored to the mast for holding the arm with freedom for swinging movement toward the mast, a dumping carrier hinged to the free end of the arm and engaging the mast as a vertical guide and adapted to receive corn from the elevator of said machine, means on the mast for releasably holding the carrier in normal position, and means for elevating the inner end of the carrier and holding the same against the mast, whereby the arm is caused to swing toward the mast and thereby bodily elevate the carrier during its dumping action.

9. The structure defined in claim 8 in further combination with brace rods extending from the mast and having anchoring means applicable to the frame of the machine.

10. The structure defined in claim 8 in further combination with brace rods extending from the mast and having anchoring means applicable to the frame of the machine, at least one of said rods being longitudinally adjustable.

11. An attachment for a corn-picking and husking machine having an elevator and including a frame bar having a bearing bracket applicable to one of the hub caps of said machine, means for attaching the frame bar to the frame of said machine, a carrier adapted to receive corn from the elevator of said machine, and means including a mast for supporting the carrier from the frame bar.

12. The structure defined in claim 11 in which the bearing bracket is free for angular movement on said hub cap.

13. The structure defined in claim 11 in which the bearing bracket is free for angular movement on said hub cap and in which said means is releasable, and a pair of brace rods attached to the mast and having detachable anchors applicable to the frame of said machine on the opposite side thereof from the respective hub cap.

In testimony whereof I affix my signature.

BERNHARD J. SYNSTELIEN.